United States Patent
Hoffmann et al.

(10) Patent No.: US 8,060,239 B2
(45) Date of Patent: Nov. 15, 2011

(54) METHOD FOR THE DETERMINATION OF A ROUGH TRAJECTORY TO BE FOLLOWED IN A POSITIONALLY GUIDED MANNER

(75) Inventors: Walter Hoffmann, Erlangen (DE); Wolfgang Papiernik, Neunkirchen (DE); Tomas Sauer, Feucht (DE)

(73) Assignee: Siemens Aktiengesellschaft, München (DE)

( * ) Notice: Subject to any disclaimer, the term of this patent is extended or adjusted under 35 U.S.C. 154(b) by 814 days.

(21) Appl. No.: 12/158,859

(22) PCT Filed: Dec. 1, 2006

(86) PCT No.: PCT/EP2006/069227
§ 371 (c)(1),
(2), (4) Date: Jun. 23, 2008

(87) PCT Pub. No.: WO2007/074025
PCT Pub. Date: Jul. 5, 2007

(65) Prior Publication Data
US 2008/0269944 A1    Oct. 30, 2008

(30) Foreign Application Priority Data
Dec. 22, 2005 (DE) .......... 10 2005 061 570

(51) Int. Cl.
*G05D 1/10* (2006.01)
*G05B 19/19* (2006.01)
*G05B 19/41* (2006.01)
(52) U.S. Cl. .......... 700/193; 700/77; 700/172
(58) Field of Classification Search .......... 700/75, 700/77, 86–88, 159, 172, 186–193, 245, 700/250–254; 318/590–595; 701/23–26; 901/3
See application file for complete search history.

(56) References Cited

U.S. PATENT DOCUMENTS
5,847,960 A * 12/1998 Cutler et al. .......... 700/187
(Continued)

FOREIGN PATENT DOCUMENTS
DE    101 56 781 C1    2/2003
(Continued)

OTHER PUBLICATIONS

Wolfgang Boehm; Inserting new knots into B-spline curves; IPC Business Press, vol. 12, No. 4 Jul. 1980, p. 199-201: Others; 1980.

(Continued)

*Primary Examiner* — M. N. Von Buhr
(74) *Attorney, Agent, or Firm* — Henry M. Feiereisen; Ursula B. Day

(57) ABSTRACT

According to the invention, an initial trajectory (2) that is to be followed in a positionally guided manner is input into a computer (15), said initial trajectory (2) being described by an initial function (AF) such that one respective corresponding position (pA) is determined on the initial trajectory (2) by substituting a scalar trajectory parameter (s) into the initial function (AF). The scalar trajectory parameter (s) is different from time (t) while being characteristic of a distance (s) covered along the initial trajectory (2). The computer (15) filters the initial trajectory (2) with low-pass characteristics referring to the scalar trajectory parameter (s) as a function of the scalar trajectory parameter (s) and thus determines a rough function (GF) such that one respective corresponding position (pG) is determined on the rough trajectory (13) by substituting the scalar trajectory parameter (s) into the rough function (GF). The computer (15) determines the rough function (GF) in such a way that the distance of the rough trajectory (13) from the initial trajectory (2) always lies below a predetermined threshold (S) regardless of the value of the scalar trajectory parameter (s).

18 Claims, 5 Drawing Sheets

U.S. PATENT DOCUMENTS

| | | | | |
|---|---|---|---|---|
| 6,677,722 B2 * | 1/2004 | Hamamura et al. | 318/632 |
| 6,825,633 B2 * | 11/2004 | Hamann et al. | 318/600 |
| 6,845,287 B2 * | 1/2005 | Galburt et al. | 700/186 |
| 6,957,121 B2 * | 10/2005 | Lottgen et al. | 700/180 |
| 7,085,620 B2 * | 8/2006 | Maeda et al. | 700/193 |
| 7,130,718 B2 * | 10/2006 | Gunnarsson et al. | 700/254 |
| 7,208,901 B2 * | 4/2007 | Ladra et al. | 318/600 |
| 7,272,524 B2 * | 9/2007 | Brogardh | 702/95 |
| 7,444,202 B2 * | 10/2008 | Fauser et al. | 700/189 |
| 7,450,127 B2 * | 11/2008 | Hong et al. | 345/474 |
| 7,778,716 B2 * | 8/2010 | Ueda et al. | 700/63 |

FOREIGN PATENT DOCUMENTS

| | | |
|---|---|---|
| DE | 698 28 530 T2 | 6/2005 |
| DE | 103 55 614 A1 | 7/2005 |
| EP | 0 594 699 B1 | 12/1995 |

OTHER PUBLICATIONS

Carl de Boor; A Practical Guide to Splines; Kapitel XII (= S. 165-198); New York; Springer-Verlag; Others; 1976; US.

* cited by examiner

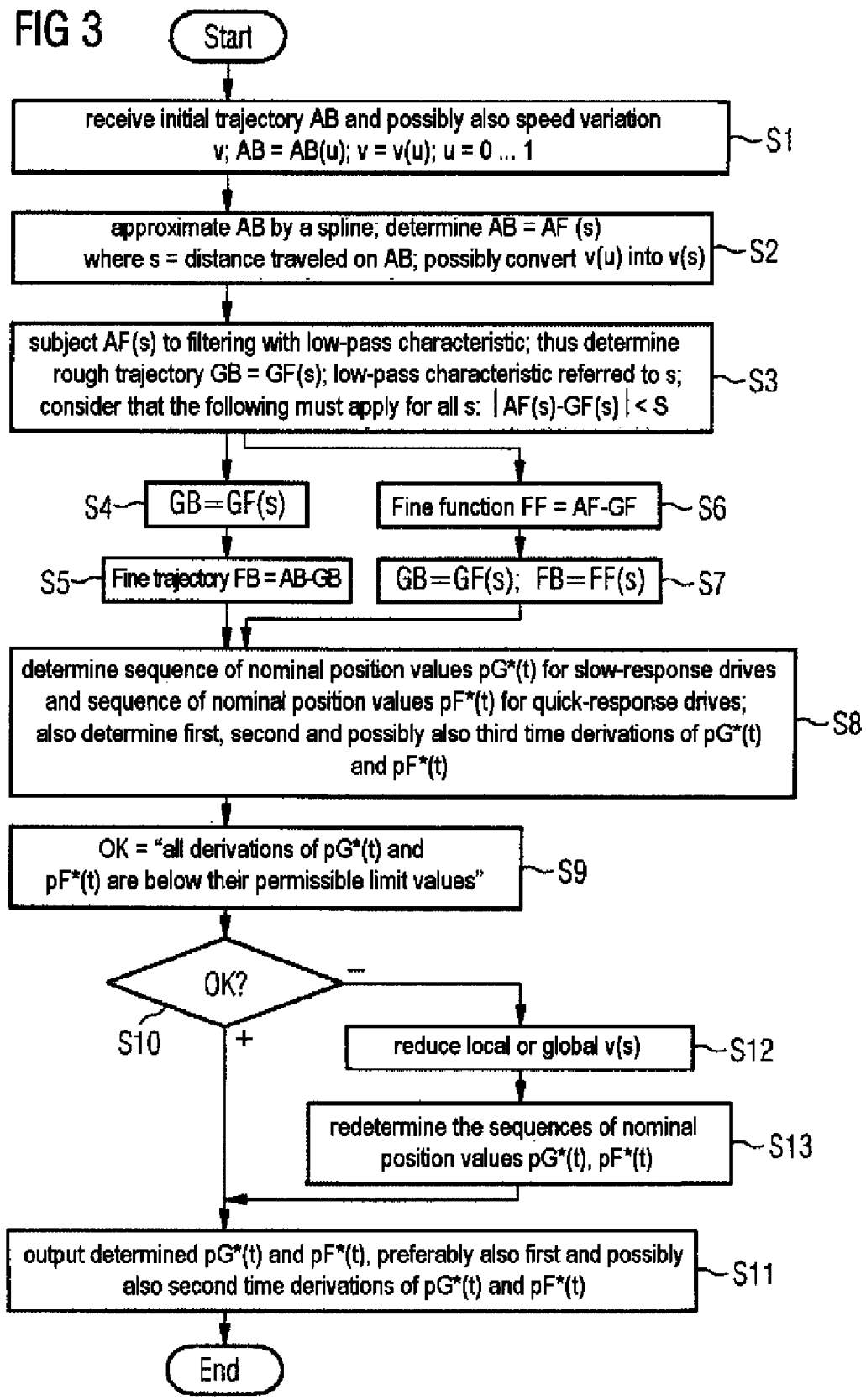

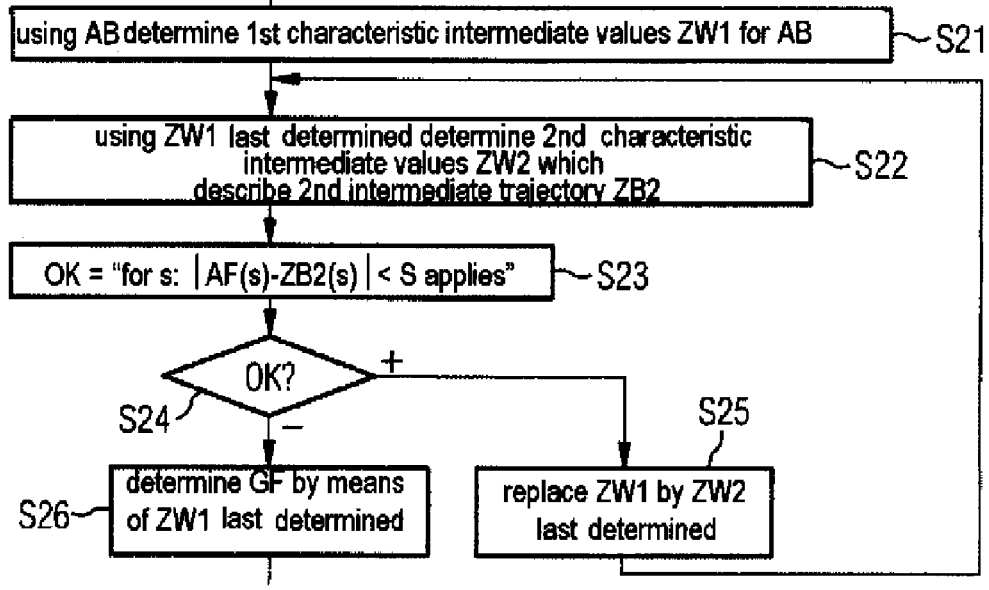
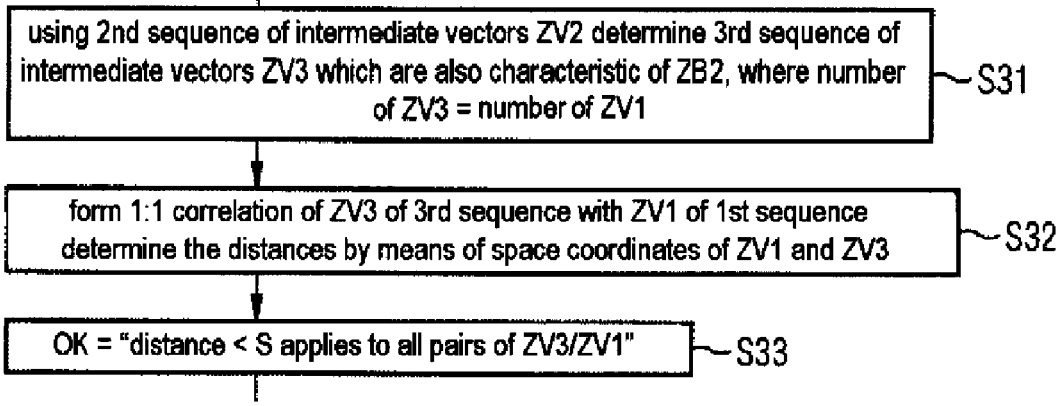
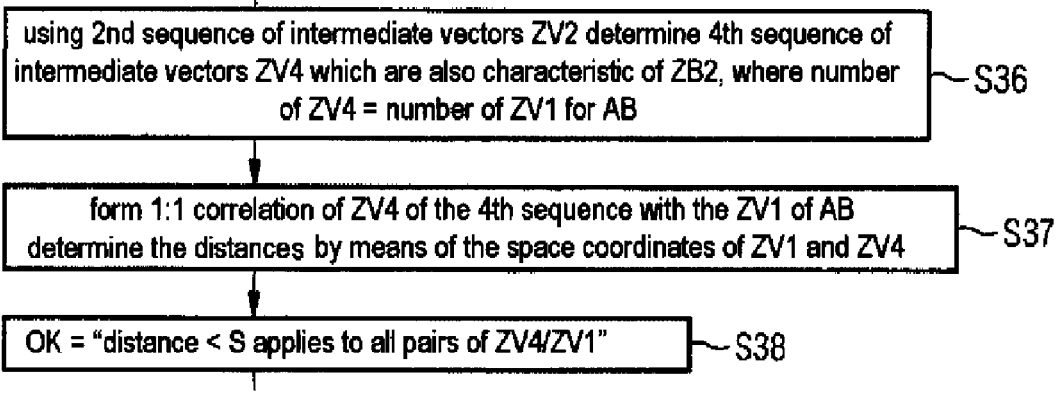

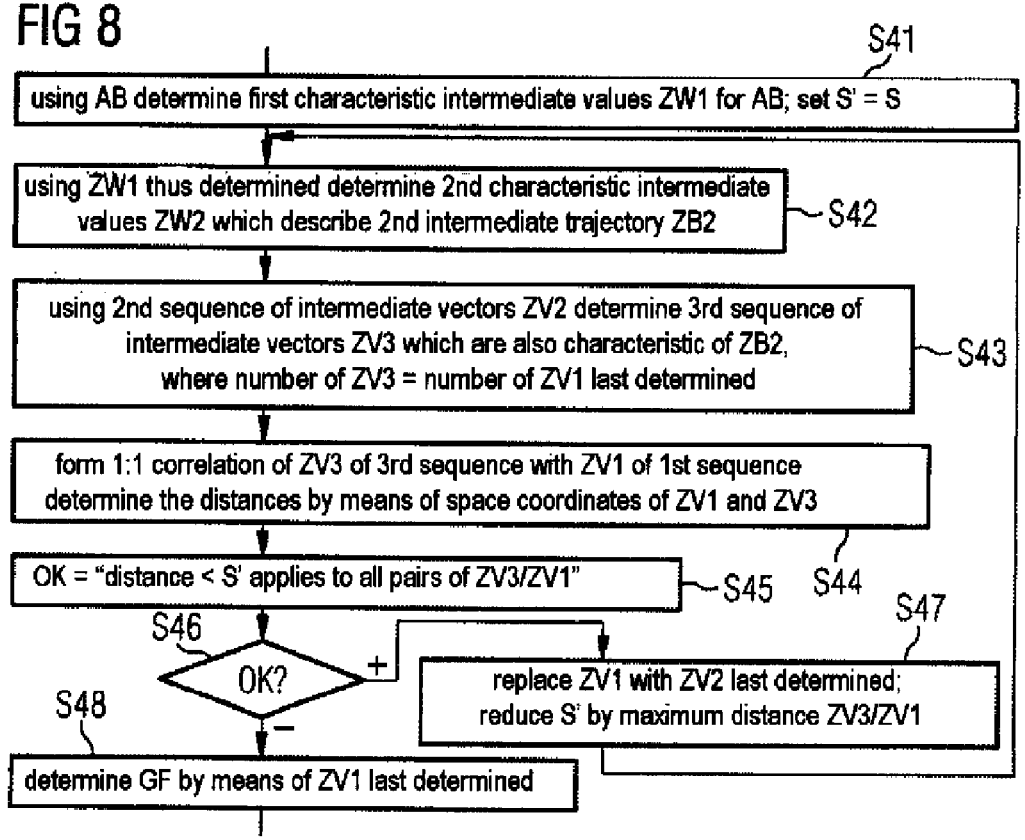
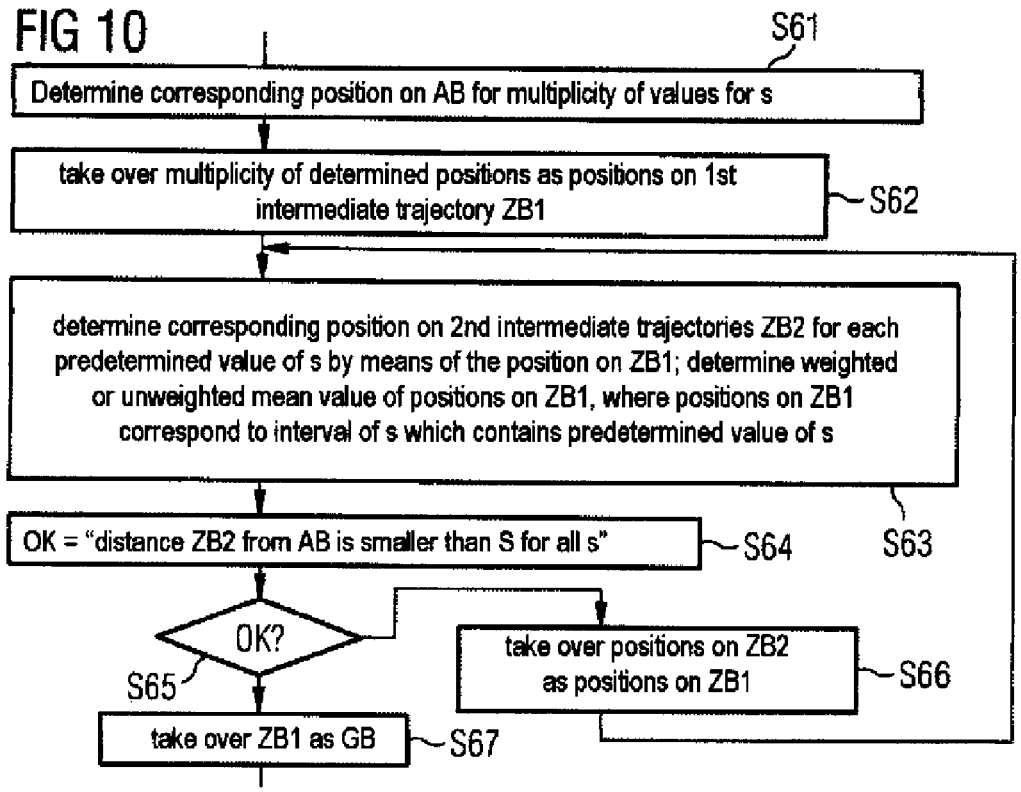

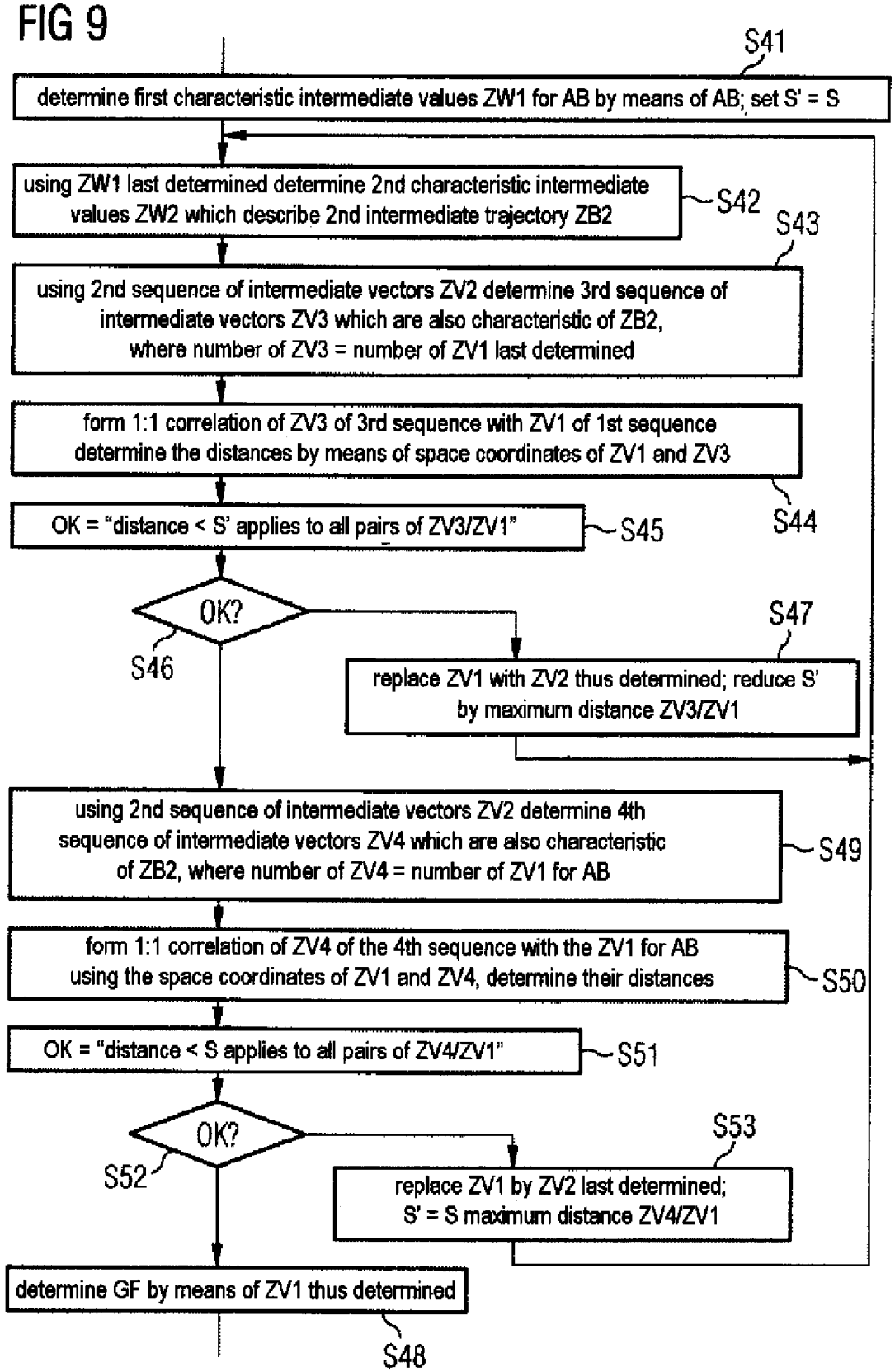

METHOD FOR THE DETERMINATION OF A ROUGH TRAJECTORY TO BE FOLLOWED IN A POSITIONALLY GUIDED MANNER

BACKGROUND OF THE INVENTION

The present invention relates to a method for the determination of a rough trajectory to be followed in a positionally guided manner, executed by a computer, wherein an initial trajectory to be followed in a positionally guided manner is input into the computer, said initial trajectory being described by an initial function so that a corresponding position on the initial trajectory is determined by substituting a scalar trajectory parameter into the initial function.

Such determination methods are generally known. By way of example, reference is made to EP 0 594 699 B1 and to DE 103 55 614.

In EP 0 594 699 B1, the initial trajectory is described as scalar trajectory parameter by means of time. In electronic filters, the trajectory components are determined which correspond to accelerations above and below a limit value, respectively. The above trajectory corresponds to the trajectory components which correspond to accelerations below the limit value. The rough trajectory is used for driving a slow-response drive. The trajectory components with accelerations above the limit value correspond to a fine trajectory. They are used for driving a quick-response drive.

In EP 0 594 699 B1, a special tuning of the possible deflection of the quick-response drive, of the possible acceleration of the slow-response drive and of the maximum permissible trajectory speed ensures that the distance of the rough trajectory from the initial trajectory remains at any time below the maximum possible deflection of the quick-response drive.

In DE 103 55 614 A1, the initial trajectory is also described as scalar trajectory parameter with time. In this document, the initial trajectory is divided into a high-frequency and a low-frequency trajectory component in electronic filters. The low-frequency trajectory component corresponds to the rough trajectory. In DE 103 55 614 A1, it is not guaranteed a priori that the distance of the rough trajectory from the initial trajectory is always below a predetermined threshold independently of the value of the scalar trajectory parameter.

To plan the movement of machines, for example processing machines, particularly machine tools, the following procedure is usually adopted in the prior art: a parts program is input into a computer. The parts program specifies, on the one hand, a contour to be followed in a positionally guided manner and, on the other hand, contains a desired (preferably constant) speed variation, also called trajectory speed in the text which follows. As a rule, the contour already corresponds to an initial trajectory to be followed in a positionally guided manner. If necessary, however, the computer can also determine the initial trajectory in advance by means of the desired contour.

As a rule, the initial trajectory is a two- or three-dimensional trajectory. However, it can also be only one-dimensional, or more than three-dimensional if both the translatory and rotatory movements are to be carried out. It is firstly given as a function of a scalar dimensionless trajectory parameter. Because it is dimensionless, this trajectory parameter is different from time, in particular. However, it is already characteristic of a path traveled along the initial trajectory, at least indirectly.

The dimensionless trajectory parameter is mapped by the computer onto a path traveled along the initial trajectory. Next, the trajectory parameter is mapped onto time by including the desired speed variation. The trajectory now determined is supplied to a test facility. The test facility is a component of the computer. It determines in a clocked manner the nominal position values—possibly also the nominal speed values—for axes to be controlled and outputs these nominal values. Furthermore, it checks the nominal position values and their time derivations (speeds, accelerations, jerks) for the maintenance of predetermined limit values. If at least one of the limit values is exceeded, the trajectory speed must be lowered at least locally and a new run through the test facility must be performed.

In the case of non-redundant kinematics, it to say if exactly one drive or one jointly driven group of drives is to be controlled for each controlled axis, this procedure is completely satisfactory. In the case of redundant kinematics, in contrast, if following the initial trajectory is divided into a rough trajectory for a low-response drive and a fine trajectory for a quick-response drive, wherein the rough trajectory and the fine trajectory complement one another to form the initial trajectory, this procedure only leads to unsatisfactory results. This applies independently of whether the test facility checks only the initial trajectory or the rough trajectory and the fine trajectory for maintenance of the limit values.

If the test facility only checks the initial trajectory for maintenance of the limit values, the limit values could—theoretically—by input in such a manner, naturally, that they can be maintained both by the slow-response drive and by the quick-response drive. Such an input of limit values would be meaningless, however, since any advantage which is to be achieved by the division into rough trajectory and fine trajectory would then be relinquished. If, however, the limit values are input in such a manner that they cannot always be met by both drives, particularly that the acceleration limit value would only be met by the quick-response drive but not by the slow-response drive, there is a risk that the traversing range of the quick-response drive is not maintained, the acceleration limit value of the slow-response drive is not maintained and/or the speed and jerk limit values of at least one of the two drives are not maintained. In addition to the initial trajectory, it must still be checked in both trajectories after the division of the initial trajectory into the rough trajectory and the fine trajectory whether their limit values are maintained. If these limit values are violated,

- the trajectory speed must be lowered at least locally,
- the scalar trajectory parameter characteristic of the traverse path, different from time, must be remapped under time by including the speed variation which is now changed,
- the rough trajectory and the fine trajectory must be redetermined and
- it must be checked again whether all limit values are maintained.

If necessary, this process must even be repeated several times before a reasonably acceptable speed variation can be determined in which the rough trajectory and the fine trajectory are determined in such a manner that all limit values are maintained for both drives. The reason for repeated iterations being required without being able to predict with reliability whether the newly found trajectories maintain the limit values is that a change in the speed variation results in a change in the division of initial trajectory into the rough trajectory and the fine trajectory.

It also may happen with this procedure that the trajectory speed must be lowered locally or globally only because the initial trajectory has been poorly divided into the rough trajectory and the fine trajectory. In other words: if the division of the initial trajectory into the rough trajectory and the fine trajectory had been determined differently, with the speed variation being unchanged, the limit values would have been maintained.

The same problems also occur if the initial trajectory is divided into the rough trajectory and the fine trajectory before the test. This is because, in this case, the test facility can immediately check all nominal position values and their time derivations for maintenance of the limit values but the repeated iteration which may be required and the problem of the possibly only poor division of the initial trajectory into the rough trajectory and the fine trajectory remain.

The abovementioned problems can also be bypassed to only a limited extent by the procedure according to EP 0 594 699 B1. Firstly, this procedure is very computationally intensive, on the one hand, since the variation of acceleration must be determined for the entire initial trajectory and the initial trajectory is divided into the rough trajectory and the fine trajectory by means of the acceleration components. Furthermore, this procedure mandatorily presupposes that the possible traverse path of the quick-response drive, the possible acceleration of the slow-response drive and the maximum trajectory speed are correspondingly matched to one another. If this matching is not guaranteed, the procedure of EP 0 594 699 B1 also exhibits the above problems. Furthermore, if the limit values of the quick-response drive are violated, rough trajectory and fine trajectory must also be redetermined in EP 0 594 699 B1 after the trajectory speed has been lowered, which can lead to other limit values being violated which have been previously maintained.

SUMMARY OF THE INVENTION

The object of the present invention consists in creating a determination method of the type initially mentioned by means of which the rough trajectory can be determined without repeated iteration of the division and testing process.

On the basis of a determination method of the type initially mentioned, the object is achieved in that the scalar trajectory parameter is different from time and is characteristic of a distance covered along the initial trajectory, the computer filters the initial trajectory with low-pass characteristics as a function of the scalar trajectory parameter and thus determines a rough function such that one respective corresponding position is determined on the rough trajectory by substituting the scalar trajectory parameter into the rough function, the low-pass characteristic is referred to the scalar trajectory parameter, and the computer determines the rough function in such a manner that the distance of the rough trajectory from the initial trajectory always lies below a predetermined threshold independently of the value of the scalar trajectory parameter.

This is because this guarantees from the beginning, on the one hand, that the permissible traversing range of the quick-response drive (=the predetermined threshold) is maintained. But mainly the division of the initial trajectory into the rough trajectory and the fine trajectory is now independent of time. A change in trajectory speed (local or global) therefore no longer has any influence on the division of the initial trajectory into the rough trajectory and the fine trajectory. It is therefore possible a) firstly to determine, by means of the initial trajectory, the rough trajectory and the fine trajectory as functions of the scalar trajectory parameter, b) then to convert the scalar trajectory parameter into time by means of the predetermined trajectory speed and thus to determine the rough trajectory and the fine trajectory as functions of time, c) next to determine the corresponding nominal position values and their time derivations (speeds, accelerations, jerks) in the test device, d) to check the time derivations for maintenance of their limit values and e) in the case of a violation of the limit values, to lower the trajectory speed locally or globally and to repeat steps b) and c) once (i.e. a single time).

On the other hand, no further (i.e. multiple) iteration is required any longer.

The rough function can be determined by the computer in various manners. It is preferred that the computer, for determining the rough function a) first determines first characteristic intermediate values of the initial trajectory, b) by means of the first characteristic intermediate values determined last, determines second characteristic intermediate values of a second intermediate trajectory, wherein the second intermediate trajectory corresponds to a filtering, referred to the trajectory parameter, with low-pass characteristics of a first intermediate trajectory which is defined by the first characteristic intermediate values, c) checks whether the distance of the second intermediate trajectory from the initial trajectory is always below the predetermined threshold independently of the value of the scalar trajectory parameter, d) in the affirmative case, replaces the first characteristic intermediate values by the second characteristic intermediate values determined last and goes back to step b), and e) in the negative case, determines the rough function by means of the first characteristic intermediate values determined last.

This is because it is then possible, by means of a gradually progressive coarsening or gradually progressive rounding-off of the initial trajectory, to determine bit by bit a rough function in which the condition that the distance of the rough trajectory from the initial trajectory is always below the predetermined threshold independently of the value of the trajectory parameter, is just met.

The formulation in the above feature e), that the rough function should be determined by means of the first characteristic intermediate values determined last, has been deliberately kept so wide. This is because, naturally, it is possible that the rough function should correspond to the first characteristic intermediate values determined last. But it should also be possible, for example, to coarsen the initial trajectory only in a first section until the rough trajectory has been determined for the section, then to coarsen it in a second section etc. until the rough function has been determined section by section. Such a procedure should also be comprised in the formulation of feature e).

For the testing in step c), it is naturally possible that the computer always directly checks the distance of the second intermediate trajectory from the initial trajectory for maintenance of the predetermined threshold. In some cases, however, it will be advantageous, particularly require less computer time, if the computer in step a), sets an auxiliary threshold to the value of the predetermined threshold, in step c), checks whether the distance of the second intermediate trajectory from the first intermediate trajectory is always below the auxiliary threshold independently of the value of the scalar trajectory parameter, and in step d), reduces the auxiliary threshold by the maximum distance of the second intermediate trajectory from the first intermediate trajectory.

It would be presumably optimal if the computer proceeds as described last and, in the case where the distance of the second intermediate trajectory from the first intermediate trajectory exceeds the auxiliary threshold, additionally directly checks the distance of the second intermediate trajectory from the initial trajectory for maintenance of the predetermined threshold, changes to step e) only if the direct distance of the second intermediate trajectory from the initial trajectory exceeds the predetermined threshold, and otherwise, sets the auxiliary threshold equal to the difference of the predetermined threshold and the maximum distance of the second intermediate trajectory from the initial trajectory and replaces the first characteristic intermediate values by the second characteristic intermediate values determined last and changes to step b).

The procedures described above are advantageous particularly if the first characteristic intermediate values form a first sequence of intermediate vectors which, among other things, contains space coordinates, the second characteristic intermediate values form a second sequence of intermediate vectors which, among other things, contain space coordinates, and the number of intermediate vectors of the second sequence is smaller than the number of intermediate vectors of the first sequence. This is because the coarsening and rounding-off of the initial trajectory or of the intermediate trajectories determined bit by bit can then be implemented in a particularly simple manner.

If the computer determines by means of the second sequence of intermediate vectors a third sequence of intermediate vectors which, among other things, contain space coordinates, the intermediate vectors of the third sequence are characteristic of the second intermediate trajectory and the number of intermediate vectors of the third sequence corresponds to the number of intermediate vectors of the first sequence, it is possible that the computer determines the distance of the second intermediate trajectory from the first intermediate trajectory by means of the space coordinates of the intermediate vectors of the first and third sequence. It is also possible that the computer determines the distance of the second intermediate trajectory from the first intermediate trajectory without determining the complete intermediate trajectories.

Analogously, it is possible that the computer determines the distance of the second intermediate trajectory from the initial trajectory by means of the space coordinates of intermediate vectors of a fourth sequence and the intermediate vectors of the initial trajectory. In this case, the computer determines, by means of the second sequence of second intermediate vectors, a fourth sequence of intermediate vectors, the intermediate vectors of the fourth sequence containing, among other things, space coordinates and being characteristic of the second intermediate trajectory, the number of intermediate vectors of the fourth sequence corresponding to the number of intermediate vectors of the initial trajectory.

As an alternative to determining the distance by means of characteristic intermediate values, the computer can also determine the rough function in that it determines for each predetermined value of the scalar trajectory parameter the corresponding position on the rough trajectory by a weighted or unweighted mean value of positions on the initial trajectory, the positions on the initial trajectory corresponding to an interval of the scalar trajectory parameter which contains the predetermined value of the scalar trajectory parameter.

The determination method according to the invention can be carried out in a particularly simple manner if the initial trajectory and the rough trajectory and any intermediate trajectories determined as part of the determination of the rough trajectory are splines. Suitable splines to be considered are, in particular, B splines.

As a rule, the computer also determines a fine trajectory, also to be followed in a positionally guided manner, in addition to the rough trajectory. In this arrangement, the computer can determine the fine trajectory, as an alternative, by forming the difference of initial trajectory and rough trajectory or by forming the difference of initial function and rough function and substituting the scalar trajectory parameter.

Due to the way in which the rough function is determined, the initial trajectory is sensitively divided into the rough trajectory and the fine trajectory. In particular, the rough trajectory is determined in such a manner that there is at least one value of the scalar trajectory parameter at which a derivation of the rough function with respect to the scalar trajectory parameter is different both from zero and from a corresponding derivation of the initial function with respect to the scalar trajectory parameter. In the case of such a value, both the corresponding slow-response drive and the corresponding quick-response drive are thus simultaneously driven with a traversing speed different from zero in the time domain.

It is possible that the determination method according to the invention is carried out online. In this case, the computer is integrated into a control device for a machine with redundant position-guided kinematics. As an alternative, it is also possible that the determination method according to the invention is carried out offline. In this case, at least two of the three nominal position values for the initial trajectory, the rough trajectory and the fine trajectory can be stored in a data medium. If the nominal position values of the trajectories are already referred to the operating cycle of the control device, their time derivations can also be stored in the data medium, if necessary. If this is done, no further interpolation is required in the control device but only the processing of the sequences of nominal position values.

BRIEF DESCRIPTION OF THE DRAWING

Further advantages and details are found in the subsequent description of an exemplary embodiment, in conjunction with the drawings, in which, in a basic representation FIG. 1 diagrammatically shows an initial trajectory, a rough trajectory and a processing machine, FIGS. 3 and 4 show flowcharts, FIG. 6 to 10 show flow charts.

DETAILED DESCRIPTION OF PREFERRED EMBODIMENTS

In the text which follows, the present invention is described in conjunction with a processing machine for metal. However, this description is meant to be purely as an example. The present invention is also described by means of a two-dimensional traversing movement. This, too, is only purely by way of example. It is crucially not a matter of the actual application and the design of the machine or the number of dimensions of the traversing movement but only of the manner of the determination of a rough trajectory to be followed in a position-guided manner by means of an initial trajectory to be followed in a position-guided manner, described in the text which follows.

Figure 1:
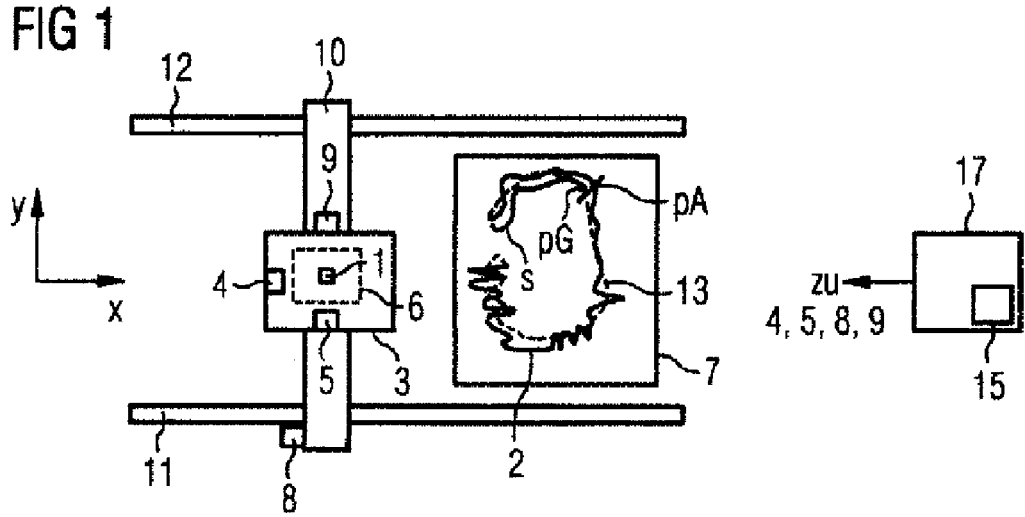
Figure 2:
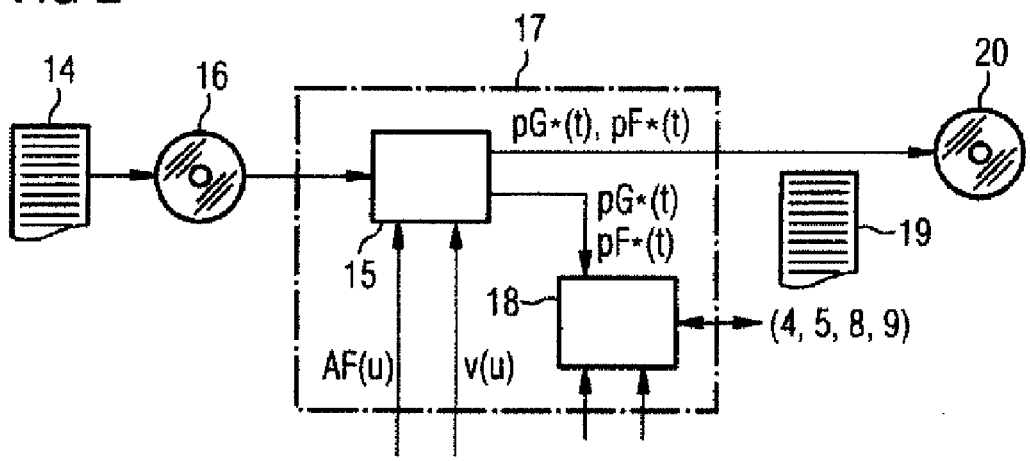
FIG. 2 shows a computer in two data media.
Figure 5:
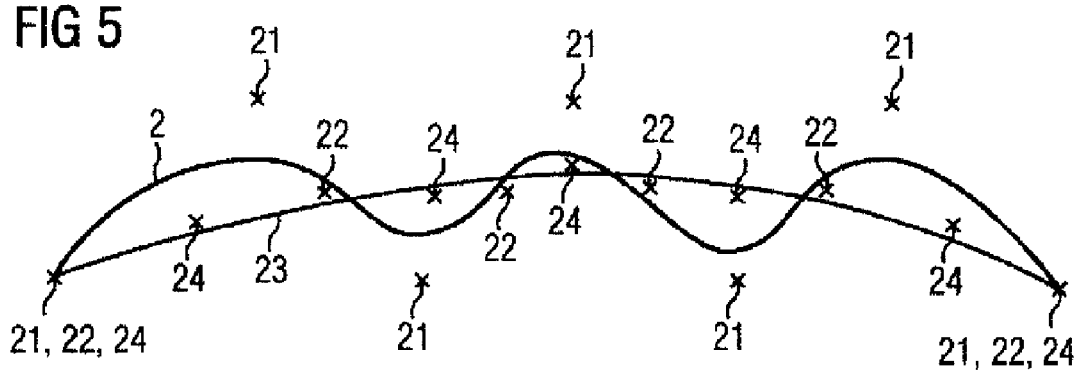
FIG. 5 shows a section of an initial trajectory and a corresponding section of a rough trajectory.

According to FIG. 1, a laser 1, for example, is to be moved in a position-guided manner precisely along an initial trajectory 2 in the xy plane. The laser 1 emits a light beam perpendicularly to the xy plane so that a metal can be processed, for example by cutting or labeling, by means of the emitted light beam. The laser 1 is arranged on an adjusting element 3. The adjusting element 3 is associated with two quick-responding drives 4, 5. The laser 1 can be moved relative to the adjusting element 3 in the x direction or y direction, respectively, by means of one each of the quick-response drives 4, 5. However, the travel of the laser 1 relative to the adjusting element 3 is relatively small both in the x direction and in the y direction. Let it be assumed purely by way of example that the laser 1 has a maximum acceleration of e.g. 30 m/s$^2$ and a travel of e.g. 5 cm for both directions x, y. This maximum travel is indicated diagrammatically in FIG. 1 by a dashed square 6.

As a rule, a workpiece 7 to be processed by the laser has considerably larger dimensions. For this reason, a further adjustment capability in the x direction and in the y direction is provided this further adjustment capability having a much greater travel, for example of 3 m×5 m. However, the further adjustment capability is much more inert. For example, two slow-response drives 8, 9 are provided which provide for a maximum acceleration of 1 m/s$^2$ in the x direction and of 3 m/s$^2$ in the y direction. For example, the adjusting element 3 can be moved in the y direction by means of the slow-response drive 9 on a carrier 10 and the carrier 10, in turn, can be moved in the x direction on rails 11, 12 by means of the slow-response drive 8.

To be able to travel the given initial trajectory 2 as quickly as possible, the traversing movements of the carrier 10, of the adjusting element 3 and of the laser 1 must be coordinated with one another in a suitable manner. Thus, a rough trajectory 13, which corresponds to a rough and rounded-off derivation of the initial trajectory 2 must be determined for moving carrier 10 and adjusting element 3. The possible travel 6 of the laser 1 relative to the adjusting element 3 must be considered in this arrangement. It must be possible, therefore, to equalize the derivation of the rough trajectory 13 from the initial trajectory 2 by means of a corresponding movement of the laser 1 relative to the adjusting element 3. Determining the rough trajectory 13—also drawn in FIG. 1 by way of example—is the core subject matter of the present invention.

Furthermore, the speed, acceleration and possibly also jerk limits of all drives 4, 5, 8, 9 must be maintained. Although it is also a component part of the present invention in its developments, it is no longer the basic component of the present invention.

To implement the present invention, a computer program 14 is first generated for a computer 15. This computer program 14 is stored in an (exclusively) machine-readable form on a data medium 16. The data medium 16 can be, for example, an internal data medium of a further computer, not shown, or a portable data medium 16 such as, for example, a CD ROM 16, a memory card or a USB memory stick.

The computer program 14 is loaded into the computer 15 and stored there, for example on its hard disk. If it is called up due to corresponding call conditions (e.g. a user input), the computer 15 carries out a determination method which will be explained in greater detail in conjunction with FIG. 3 to 10 in the text which follows. The computer 15 is thus programmed (or more generally designed) in such a manner by the computer program 14 that it executes such a determination method.

According to FIG. 3, the initial trajectory 2 is input into the computer 15 in a step S1. For example, a parts program according to the DIN 66025 is input into the computer 15. In this case, a speed variation v with which the initial trajectory 2 is to be followed is also input into the computer 15 in addition to the initial trajectory 2. Independently of whether the speed variation v is also input into the computer 15 or not, in addition to the initial trajectory 2, the predetermined initial trajectory 2 is described, as a rule, by an initial function AF so that a corresponding position pA on the initial trajectory 2 is in each case determined by substituting a scalar trajectory parameter u into the initial function AF. If necessary, the same also applies to the speed variation v if this is not input.

As a rule, the scalar trajectory parameter u is first a universal trajectory parameter u. The universal trajectory parameter u is dimensionless and thus, in particular, different from time t. However, it can be recalculated into a travel s traveled along the initial trajectory 2, independently of the speed variation v. It is therefore already characteristic of the travel s.

As far as required, the computer 15 approximates, in a step S2, the initial trajectory 2 by a spline, for example by a B spline, particularly a third-order B spline, or a Bezier spline. For the sake of completeness, it should be mentioned that a third-order B spline is a smooth curve assembled section by section, where each section of the smooth curve can be described by a relation $as^3+bs^2+cs+d$. The letters a, b, c and d in each case stand for a vector in the position space. s is the travel s on the initial trajectory 2, already mentioned.

By approximating the initial trajectory 2 by means of a spline, the computer 15 has available as a result an initial function AF (namely the spline) which is directly a function of the distance s covered along the initial trajectory 2. If the speed variation v is also input, it, too, can be recalculated into a speed variation v as a function of the distance s covered along the initial trajectory 2 as part of the step S2.

The procedure according to steps S1 and S2 is generally known to the experts in the field. It is also adopted, in particular, when the initial trajectory 2 would only have to be approached by means of the slow-response drives 8, 9 for the x direction and the y direction, that is to say the laser 1 would be arranged rigidly relative to the adjusting element 3 according to the above example. Steps S1 and S2 do not, therefore, require more detailed explanations.

In a step S3, the computer 15 filters the initial function AF with low-pass characteristics. The crucial factor is here that the initial function AF, when it is filtered, is not predetermined as function of time t but as function of the universal trajectory parameter u or of the travel s. It is preferred that the initial function AF is directly a function of the distance s covered along the initial trajectory 2. In the text which follows, the travel s is therefore also always designated as scalar trajectory parameter. However, the dimensionless universal trajectory parameter u could also be used.

Corresponding to the circumstance that the initial function AF is not a function of time t but a function of the scalar trajectory parameter s, the low-pass characteristic is not related to time t but to the scalar trajectory parameter s.

In step S3, the computer 15 thus determines a rough function GF as function of the scalar trajectory parameter s. Substituting the scalar trajectory parameter s into the rough function GF thus determines a corresponding position pG on the rough trajectory 13 which corresponds to the position pA on the initial trajectory 2 which is determined by the same value of the scalar trajectory parameter s.

Naturally, the filtering of the initial function AF must not be too coarse. This is because it must be such that the distance of the rough trajectory 13 from the initial trajectory 2 always remains below a predetermined threshold S independently of the value of the scalar trajectory parameter s. It will be explained later in detail how this can be achieved.

After step S3, steps S4 and S5 can be carried out. In step S4, the computer 15 determines the rough trajectory 13 by means of the rough function GF. In step S5, the computer 15 determines a fine trajectory by forming the difference between initial trajectory 2 and rough trajectory 13. In this context, the fine trajectory must be followed in a position-guided manner just like the initial trajectory 2 and the rough trajectory 13.

As an alternative to steps S4 and S5, the computer 15 could also executes steps S6 and S7. In step S6, the computer 15 determines a fine function FF by forming a difference of initial function AF and rough function GF. In step S7, the computer 15 determines the rough trajectory 13 by means of the rough function GF and the fine trajectory by means of the fine function FF.

In a step S8, the computer 15 then carries out a determination, known per se, separately for the rough trajectory 13 and the fine trajectory. This is because it determines in step S8, in a manner known per se, the rough trajectory 13 and the fine trajectory as functions of time t. This determines by means of the rough trajectory 13 a sequence of nominal position values pG*(t) for the slow-response drives 8, 9 and, by means of the fine trajectory, a corresponding sequence of nominal position values pF*(t) for the quick-response drives 4, 5. In this context, immediately successive nominal position values pG*(t), pF*(t) must be executed offset by a predetermined timing cycle. The nominal position values pG*(t), pF*(t) determined are first stored internally by the computer 15. Depending on the number of axes to be driven, the nominal position values pG*(t), pF*(t) can be scalar quantities (one-dimensional case) or multi-dimensional quantities (multi-dimensional case).

As part of step S8, the computer 15 also determines at least the first and second derivations of the nominal position values pG*(t), pF*(t) with time t. It thus determines at least the speeds and the accelerations. It may also determine, as part of step S8, the third derivations of the nominal position values pG*(t), pF*(t) with time t, that is to say the jerks.

In a step S9, the computer 15 then determines the value of a logical variable OK. The logical variable OK assumes the value "TRUE" if the time derivations determined in step S8 are all below the limit values permissible for them. Otherwise, the logical variable OK assumes the value "UNTRUE" OR "FALSE". The value of the logical variable OK is checked by the computer 15 in a step S10.

If the logical variable OK has assumed the value "TRUE", the computer 15 changes directly to a step S11. In step S11, the computer 15 outputs the nominal position values pG*(t), pF*(t) determined. The computer 15 preferably also outputs the corresponding speed values (first time derivations). The computer 15 may also output the corresponding acceleration values (=second time derivations).

If the computer 15 executes the determination method described above online, it is integrated into a control device 17 for the processing machine. In this case, the computer 15 outputs the sequences of nominal position values pG*(t), pF*(t), the corresponding speed values and possibly also the corresponding acceleration values directly to control devices 18 for the corresponding drives 4, 5, 8, 9. If, in contrast, the computer 15 executes the determination method described above offline, the computer 15 stores the sequences of nominal position values pG*(t), pF*(t), the corresponding speed values and possibly also the corresponding acceleration values as a file 19 on a data medium 20. The data medium 20 can again be an internal data medium of the computer 15, for example a hard disk of the computer 15. However, it can also be a portable data medium 20 such as, for example, a CD ROM 20, a memory card or a USB memory stick.

Theoretically, the computer 15 could save the nominal position values pG*(t), pF*(t) (possibly including the derivations for the nominal position values) for any two trajectories of the initial trajectory 2, rough trajectory 13 and fine trajectory since it applies both to the nominal position values pG*(t), pF*(t) and to the derivations that the value for the initial trajectory 2 must be the result of the sum of the values for the rough trajectory 13 and the fine trajectory. If two of the values are given, the third value can thus also be determined immediately by forming the sum or difference. Independently of the actual design, that is to say independently of the trajectories of initial trajectory 2, rough trajectory 13 and fine trajectory for which the nominal position values pG*(t), pF*(t), are stored on the data medium 20, it applies that (at least) two sequences of nominal position values pG*(t), pF*(t) are stored on the data medium 20, each nominal position value pG*(t) of one sequence corresponding to a nominal position value pF*(t) of the other sequence and one each of the sequences corresponding to a sequence of nominal positions on the initial trajectory 2, the rough trajectory 13 or the fine trajectory.

If, in contrast, the test in step S10 has had the result that the logical variable OK has the value "UNTRUE" or "FALSE", step S11 must not be executed directly.

Instead, steps S12 and S13 must first be carried out.

In step S12, the computer 15 lowers the speed variation v. In this context, the speed variation v can be lowered locally, that is to say only in the areas of the travel s at which one or more of the derivations of the nominal position values pG*(t), pF*(t) exceeds the permissible limit values. However, the lowering can also be done globally, that is to say over the entire distance s. The extent of the required lowering of speed can be easily determined by means of the extent by which the derivations of the nominal position values pG*(t), pF*(t) exceeds the permissible limit values. In step S13, therefore, the computer 15 can again perform a determination in the sense of step S8, the execution of step S13 ensuring, however, that all limit values are now maintained.

In practice, the execution of step S13 is preferably implemented in that, instead of executing step S13 as such, the program jumps back to step S8. The representation according to FIG. 3, however, expresses the essential advantage of the present invention more clearly: this is because, due to the fact that the rough trajectory 13 determined in step S3—and with it also the fine trajectory—is retained in spite of the change in the speed variation v, no multiple iteration with a cautious approach to a suitable division into rough trajectory 13 and fine trajectory is required. Instead, only a single division of the initial trajectory 2 into rough trajectory 13 and fine trajectory and, if necessary, a single correction of the speed variation v is required.

In the text which follows, a preferred method for the determination of the rough trajectory 13 is explained in greater detail by way of example in conjunction with FIG. 4. It should be pointed out in advance, however, that, although the method described in the text which follows is preferred, it is not the only possible method.

According to FIG. 4, the computer 15 first determines first characteristic intermediate values by means of the initial trajectory 2 in a step S21. The first characteristic intermediate values then form a first sequence of intermediate vectors. According to FIG. 5, the intermediate vectors of the first sequence contain space coordinates of so-called control points 21 of the initial trajectory 2 and the corresponding node values of the control points 21. The determination of the control points 21 and also the determination of the corresponding node values of splines—and the initial trajectory 2 is a spline, see step S2 of FIG. 3—is generally known to the experts in the field and described, e.g. in the technical book "A Practical Guide to Splines" by Carl de Boor, Springer-Verlag 1978.

Using the first characteristic intermediate values, the computer 15 determines second characteristic intermediate values in a step S22. The second characteristic intermediate values form a second sequence of intermediate vectors. According to FIG. 5, the intermediate vectors of the second sequence contain the space coordinates of control points 22 and the corresponding node values for a second intermediate trajectory 23. In this context, the first intermediate vector of the first sequence and the last intermediate vector of the first sequence are taken over in the second sequence unchanged as first and last intermediate vector, respectively. For example, the space coordinates of the remaining intermediate vectors of the second sequence are determined by weighted or unweighted averaging of in each case two immediately successive intermediate vectors of the first sequence, see also FIG. 5. The determination of the corresponding node values is familiar to every expert in the field and describe, for example, in the technical report "Inserting New Knots unto B-Spline Curves" by W. Boehm, IPC Business Press 1980.

The second intermediate trajectory 23 is thus also a spline of the same type as the initial trajectory 2, for example again a B spline. According to FIG. 5, the number of intermediate vectors of the second sequence, that is to say the number of the second characteristic intermediate values, is, however, smaller than the number of intermediate vectors of the first sequence. Corresponding to this, the second intermediate trajectory 23 which is determined by the second sequence of intermediate vectors is a filtering with low-pass characteristics of the initial trajectory 2 with reference to the scalar trajectory parameter s.

In steps S23 and S24, the computer 15 checks whether the distance of the second intermediate trajectory 23 from the initial trajectory 2 is always below the predetermined threshold S independently of the value of the scalar trajectory parameter s. If this is so, the computer 15 replaces the first characteristic intermediate values by the second characteristic intermediate values in a step S25 and goes back to step S22. Otherwise, the computer 15 determines the rough function GF by means of the first intermediate values in a step S26. Since the rough function GF is thus determined either by means of the first characteristic intermediate values of the initial trajectory 2 or—because of step S25—by means of the second characteristic intermediate values of a second intermediate trajectory 23, the rough trajectory 13 determined by means of the rough function GF is also a spline.

The distance of the second intermediate trajectory 23 from the initial trajectory 2 is preferably determined by the computer 15 separately for the x direction and the y direction. However, it would also be possible to determine a geometric distance according to the formula $a^2 = \delta x^2 + \delta y^2$ (where $\delta x$=distance in the x direction and $\delta y$=distance in the y direction).

In order to check, in accordance with step S23, whether distance of the second intermediate trajectory 23 from the initial trajectory 2 is always below the predetermined threshold S independently of the value of the scalar trajectory parameter s, it is naturally possible, in principle, to determine in each case the distance of the second intermediate trajectory 23 from the initial trajectory 2 for a sufficiently dense sequence of values of the scalar trajectory parameter s and to compare the largest one of these distances with the predetermined threshold S. However, this procedure is computationally very intensive. The following implementation of step S23 is much more elegant:

According to the algorithm by Boehm (to be found in the above-mentioned technical report by Boehm, for example), the computer 15 determines a third sequence of intermediate vectors by means of the second sequence of intermediate vectors in a step S31 according to FIG. 6. The intermediate vectors of the third sequence also contain, among other things, space coordinates of control points 24—see again FIG. 5. There are third characteristic intermediate values for the same second intermediate trajectory 23 which is also described by the second characteristic intermediate values. The number of intermediate vectors of the third sequence corresponds to the number of intermediate vectors of the first sequence according to FIG. 5. The computer 15 can therefore form a 1:1 correlation of the intermediate vectors of the first sequence with the intermediate vectors of the third sequence in a step S32. Also in step S32, the computer 15 can thus determine for each such pair of intermediate vectors the distance of these two intermediate vectors from one another by means of their space coordinates. In the case of B splines, the maximum value of these distances represents an upper limit for the distance of the corresponding splines, that is to say the corresponding trajectories 2, 23 in this case, which is generally known to experts in the field. It is therefore possible that the computer 15 determines the logical variable OK in a step 33 by only comparing the maximum value of the distances determined in step S32 with the predetermined threshold S.

In the first iteration of FIG. 4—that is to say when the first characteristic intermediate values correspond to the initial trajectory 2, the second intermediate trajectory 23 is always compared with the initial trajectory 2 as part of step S23 or, respectively, the space coordinates of the corresponding intermediate vectors are always compared with one another as part of step S33. In later iterations, that is to say when the first characteristic intermediate values no longer correspond to the initial trajectory 2 but to their own intermediate trajectory (called first intermediate trajectory in the text which follows), various procedures are possible which will be explained in the text which follows.

Thus, according to FIG. 7, it is possible, for example, that the computer 15, for implementing step S23, determines a fourth sequence of intermediate vectors by means of the second sequence of intermediate vectors in a step S36, the number of intermediate vectors of the fourth sequence corresponding to the number of intermediate vectors for the initial trajectory 2 and the fourth sequence of intermediate vectors being characteristic of the second intermediate trajectory 23. The intermediate vectors of the fourth sequence can be determined, for example, by correspondingly frequent repetition of step S31 of FIG. 6. In a step S37, the computer can perform a 1:1 correlation of the intermediate vectors of the fourth sequence with the intermediate vector for the initial trajectory 2—analogously to step S32 of FIG. 6, and, using the space coordinates of the intermediate vector pairs, determine their distances. In a step S38, the computer 15 determines the value of the logical variable OK analogously to step S33 of FIG. 6 by checking whether the maximum value of the distances determined in step S37 is smaller than the predetermined threshold S.

In the procedure according to FIG. 7, the computer 15 thus always directly checks the distance of the second intermediate trajectory 23 from the initial trajectory 2 for maintenance of the predetermined threshold S. As an alternative to the direct comparison of the second intermediate trajectory 23 with the initial trajectory 2 (or the corresponding intermediate vectors with one another), it is also possible, according to FIG. 8, to slightly modify the procedure of FIG. 4.

According to FIG. 8, the computer 15 initially determines by means of the initial trajectory 2 its characteristic first intermediate values in a step S41. To this extent, step S41 corresponds to step S21 of FIG. 4. In addition, however, the computer 15 sets an auxiliary threshold S' to the value of the predetermined threshold S in step S41.

A step S42 corresponds to the step S22 of FIG. 4. Steps S43 and S44 correspond to steps S31 and S32 of FIG. 6. A detailed explanation of steps S42 to S44 can be omitted, therefore.

In a step S45, the computer 15 determines the value of the logical variable OK. Step S45 essentially corresponds to step S33 of FIG. 6. In contrast to step S33 of FIG. 6, however, the distances determined in S44 are not compared with the predetermined threshold S but with the auxiliary threshold S' defined in step S41.

Steps S46 to S48 essentially correspond to steps S24 to S26 of FIG. 4. The only difference to steps S24 to S26 of FIG. 4 consists in that in step S47 of FIG. 8, the value of the auxiliary threshold S' is additionally also newly determined. This is because it is reduced by the maximum distance of the intermediate vectors from one another.

Compared with the procedure of FIG. 7, the procedure of FIG. 8 has the advantage that it is computationally much more efficient. This rough trajectory 13 can thus be determined more rapidly in this manner.

However, this procedure, too, can still be optimized further. This will be explained in greater detail in conjunction with FIG. 9 in the text which follows.

The procedure according to FIG. 9 is based on the procedure of FIG. 8. In particular, steps S41 to S48 are identically transferred. Between steps S46 and S48, however, steps S49 to S53 are inserted.

Steps S49 to S51 correspond to steps S36 to S38 of FIG. 7. Step S52 is again used for checking the logical variable OK newly determined in step S51. In step S53, the computer 15 replaces the first characteristic intermediate values by the second characteristic intermediate values analogously to step S47. Furthermore, it sets the auxiliary threshold S' to the difference of the predetermined threshold S and the maximum distance determined in step S50.

B splines, in particular, have the characteristic, among other things, that removing a characteristic intermediate vector only influences the spine locally (that is to say around the removed intermediate vector). It is possible, therefore to divide the first intermediate trajectory into sections which adjoin one another. To each section in this case, such a number of intermediate vectors are allocated in the first sequence that at least the elimination of the center intermediate vector of this section changes the first intermediate trajectory only within this section but does not influence it outside this section. The required number of intermediate vectors is determined in this case by, e.g. the complexity of the polynomial on which the spline is based.

In this procedure, the number of intermediate vectors per section can be reduced at least once. This has the effect that the number of intermediate vectors is lowered by more than one with each iteration. If then the test criterion of step S24 is violated by a second intermediate trajectory 23, the following procedure can be adopted:

The computer 15 checks the sections in which the second intermediate trajectory 23 is too far away from the initial trajectory 2. In these sections, it determines the rough trajectory 13 by means of the first intermediate values determined last. For the remaining sections, the computer 15 can carry out further filterings with low-pass characteristic, that is to say coarsen the initial trajectory 2 even further.

The formulations with respect to step S26 of FIG. 4 or of the corresponding step S48 of FIGS. 8 and 9, respectively, should also comprise, in particular, the sectional determination of the rough trajectory 13 outlined above. It should also be possible to carry out the procedure according to FIG. 3 to 9 initially in a first section of the initial trajectory and then in a second section of the initial trajectory 2 etc.

The type of determination of the rough function GF and of the rough trajectory 13 described above is very efficient and is therefore preferred. However, it is also possible to determine the rough trajectory 13 in another manner. This will be explained in greater detail in conjunction with FIG. 10 in the text which follows.

According to FIG. 10, the computer 15, for implementing step S3 of FIG. 3, first determines for a multiplicity of values of the scalar trajectory parameter s the respective positions pA on the initial trajectory 2 in a step S61. The values of the scalar trajectory parameter s are here selected to be equidistant in the simplest case. However, another type of selection is also possible.

In a step S62, the computer 15 accepts the multiplicity of positions pA as positions of a first intermediate trajectory and thus defines the first intermediate trajectory. In a step S63, the computer 15 then determines for each predetermined value of the scalar trajectory parameter s, by means of the positions on the first intermediate trajectory, corresponding positions on the second intermediate trajectory. The positions on the first intermediate trajectory used by the computer 15 for determining a position on the second intermediate trajectory correspond to an interval of the scalar trajectory parameter s which contains the predetermined value of the trajectory parameter s for the respective position on the second intermediate trajectory. By means of the corresponding positions on the first intermediate trajectory, the computer 15 determines (still as part of step S63), a weighted or unweighted mean value of the positions on the first intermediate trajectory. This mean value corresponds to the position on the second intermediate trajectory.

In steps S64 and S65, the computer 15 checks whether the distance of the second intermediate trajectory from the initial trajectory 2 is always below the predetermined threshold S independently of the value of the scalar trajectory parameter s. In this context, the function of step S64 corresponds to that of step S23 of FIG. 3. Analogously to FIGS. 7, 8 and 9, step S64 can therefore be implemented it in such a manner that the second intermediate trajectory is always directly compared with the initial trajectory 2, the second intermediate trajectory is always compared with the first intermediate trajectory and an auxiliary threshold is correspondingly adapted, or although, as a rule, only the second intermediate trajectory is compared with the first intermediate trajectory, the second intermediate trajectory, as an exception, is also directly compared with the initial trajectory and an auxiliary threshold is always correspondingly adapted.

Steps S66 and S67 essentially correspond to steps S25 and S26 of FIG. 3.

Independently of whether the rough trajectory 13 is determined in accordance with the procedure of FIG. 3 to 9 or in accordance with the procedure of FIG. 10 (or of its variants, respectively), the rough trajectory 13 is always determined in such a manner that there is at least one value of the scalar trajectory parameter s at which a derivation of the rough function GF with respect to the scalar trajectory parameter s is different both from zero and from a corresponding derivation of the initial function AF with respect to the scalar trajectory parameter s.

What is claimed is:

1. A method for determining a position-guided coarse trajectory for a machine drive or tool, comprising the steps of:
defining an initial position-guided trajectory, said initial position-guided trajectory defined by an initial function having a scalar trajectory parameter defining a corresponding position on the initial trajectory, said scalar trajectory parameter representing a distance travelled along the initial trajectory,
filtering the initial trajectory with a low-pass filter to determine a coarse function, said low-pass filter being a function of the scalar trajectory parameter,
inserting the scalar trajectory parameter in the coarse function to determine a position on a coarse trajectory, and
determining a distance between the coarse trajectory and the initial position-guided trajectory so that the distance is always smaller than a predetermined threshold value independent of a value of the scalar trajectory parameter.

2. The method of claim 1, wherein determining the coarse function comprises the steps of:
a) determining first characteristic intermediate values of the initial trajectory,
b) determining second characteristic intermediate values of a second intermediate trajectory by using the determined first characteristic intermediate values and filtering the second intermediate trajectory with the low-pass filter used to filter a first intermediate trajectory defined by the first characteristic intermediate values,
c) checking if a distance between the second intermediate trajectory and the initial trajectory is smaller than the predetermined threshold value, and
d) if the distance of the second intermediate trajectory from the initial trajectory is smaller than the predetermined threshold value, replacing the first characteristic intermediate values with the second characteristic intermediate values and returning to step b), and
e) if the distance of the second intermediate trajectory from the initial trajectory is greater than or equal to the predetermined threshold value, determining the coarse function from the first characteristic intermediate values that were determined last.

3. The method of claim 2, wherein the distance between the second intermediate trajectory and the initial trajectory is checked continuously so that the distance remains smaller than the predetermined threshold value.

4. The method of claim 2, further comprising the steps of:
in step a), adding an auxiliary threshold value to the predetermined threshold value,
in step c), checking if a distance between the second intermediate trajectory and the initial trajectory is smaller than the auxiliary threshold value independent of the value of the scalar trajectory parameter, and
in step d), decreasing the auxiliary threshold value by a maximum distance between the second intermediate trajectory and the first intermediate trajectory.

5. The method of claim 4, wherein if the distance between the second intermediate trajectory and the first intermediate trajectory exceeds the auxiliary threshold value,
checking that an immediate distance between the second intermediate trajectory and the initial trajectory remains smaller than the predetermined threshold value,
if the immediate distance between the second intermediate trajectory and the initial trajectory exceeds the predetermined threshold value, transitioning to step e), and
if the immediate distance between the second intermediate trajectory and the initial trajectory is smaller than or equal to the predetermined threshold value, setting the auxiliary threshold value equal to a difference between the predetermined threshold value and the maximum distance between the second intermediate trajectory and the initial trajectory, and replacing the first characteristic intermediate values by the second characteristic intermediate values that were determined last, and returning to step b).

6. The method of claim 2, wherein the first characteristic intermediate values form a first sequence of intermediate vectors and the second characteristic intermediate values form a second sequence of intermediate vectors, and wherein a number of intermediate vectors of the second sequence is smaller than a number of intermediate vectors of the first sequence.

7. The method of claim 6, wherein at least one of the first and second sequence of intermediate vectors comprises spatial coordinates.

8. The method of claim 6, further comprising the steps of:
determining from the second sequence of intermediate vectors a third sequence of intermediate vectors characteristic of the second intermediate trajectory, wherein a number of intermediate vectors of the third sequence corresponds to the number of intermediate vectors of the first sequence, and
determining from spatial coordinates of the intermediate vectors of the first and third sequence a distance between the second intermediate trajectory and the first intermediate trajectory.

9. The method of claim 6, further comprising the steps of:
determining from the second sequence of intermediate vectors a fourth sequence of intermediate vectors characteristic of the second intermediate trajectory, wherein a number of intermediate vectors of the fourth sequence corresponds to the number of intermediate vectors of the initial trajectory, and
determining from spatial coordinates of the intermediate vectors of the fourth sequence and the initial trajectory a distance between the second intermediate trajectory and the initial trajectory.

10. The method of claim 1, wherein determining the coarse trajectory comprises the step of:
for each value of the scalar trajectory parameter, determining a position on the coarse trajectory from weighted or unweighted average position values on the initial trajectory, wherein the positions on the initial trajectory correspond to an interval of the scalar trajectory parameter, with the interval including the corresponding value of the scalar trajectory parameter.

11. The method of claim 1, wherein the initial trajectory and the coarse trajectory are splines.

12. The method of claim 2, wherein the first and second intermediate trajectories are splines.

13. The method of claim 1, further comprising the step of determining a position-guided fine trajectory by forming a difference between the initial trajectory and the coarse trajectory, or between the initial function and the coarse function.

14. The method of claim 1, wherein the coarse trajectory is determined so that there is at least one value of the scalar trajectory parameter where a derivative of the coarse function with respect to the scalar trajectory parameter is different both from zero and from a corresponding derivative of the initial function with respect to the scalar trajectory parameter.

15. A computer program which enables a computer, after the program is loaded into a memory of the computer, to execute a method for determining a position-guided coarse trajectory for a machine drive or tool, by performing the steps of:
- defining an initial position-guided trajectory, said initial position-guided trajectory defined by an initial function having a scalar trajectory parameter defining a corresponding position on the initial trajectory, said scalar trajectory parameter representing a distance travelled along the initial trajectory,
- filtering the initial trajectory with a low-pass filter to determine a coarse function, said low-pass filter being a function of the scalar trajectory parameter,
- inserting the scalar trajectory parameter in the coarse function to determine a position on a coarse trajectory, and
- determining a distance between the coarse trajectory and the initial position-guided trajectory so that the distance is always smaller than a predetermined threshold value independent of a value of the scalar trajectory parameter.

16. The method of claim 15, wherein the method steps are performed online or offline.

17. A computer-readable storage medium having stored thereon a program which enables a computer, after the program is loaded into a memory of the computer, to execute a method for determining a position-guided coarse trajectory for a machine drive or tool, with the steps of:
- defining an initial position-guided trajectory, said initial position-guided trajectory defined by an initial function having a scalar trajectory parameter defining a corresponding position on the initial trajectory, said scalar trajectory parameter representing a distance travelled along the initial trajectory,
- filtering the initial trajectory with a low-pass filter to determine a coarse function, said low-pass filter being a function of the scalar trajectory parameter,
- inserting the scalar trajectory parameter in the coarse function to determine a position on a coarse trajectory, and
- determining a distance between the coarse trajectory and the initial position-guided trajectory so that the distance is always smaller than a predetermined threshold value independent of a value of the scalar trajectory parameter.

18. A computer-readable storage medium having stored thereon two sequences of nominal position values, wherein each nominal position value of one sequence corresponds to a nominal position value of the other sequence, wherein one of the sequences corresponds to a sequence of positions on an initial trajectory, a coarse trajectory or a fine trajectory, and another of the sequences corresponds to a sequence of positions on a different trajectory selected from an initial trajectory, a coarse trajectory and a fine trajectory, the computer-readable storage medium further having stored thereon a program which enables a computer, after the program is loaded into a memory of the computer, to execute a method for determining a position-guided coarse trajectory for a machine drive or tool, with the steps of:
- defining an initial position-guided trajectory, said initial position-guided trajectory defined by an initial function having a scalar trajectory parameter defining a corresponding position on the initial trajectory, said scalar trajectory parameter representing a distance travelled along the initial trajectory,
- filtering the initial trajectory with a low-pass filter to determine a coarse function, said low-pass filter being a function of the scalar trajectory parameter,
- inserting the scalar trajectory parameter in the coarse function to determine a position on a coarse trajectory, and
- determining a distance between the coarse trajectory and the initial position-guided trajectory so that the distance is always smaller than a predetermined threshold value independent of a value of the scalar trajectory parameter,
- wherein the fine trajectory corresponds to a difference between the initial trajectory and the coarse trajectory.

* * * * *